US012701341B2

(12) United States Patent
Ishii

(10) Patent No.: US 12,701,341 B2
(45) Date of Patent: Aug. 4, 2026

(54) IMAGING DEVICE INCLUDING AN ARRAY OF PHOTOSENSITIVE ELEMENTS AND A FIRST COUNTER FOR COUNTING PHOTON DETECTION EVENTS RECEIVED FROM A FIRST GROUP OF PHOTOSENSITIVE ELEMENTS AND METHOD THEREFORE

(71) Applicant: Sony Semiconductor Solutions Corporation, Atsugi (JP)

(72) Inventor: Hiroyasu Ishii, Stuttgart (DE)

(73) Assignee: Sony Semiconductor Solutions Corporation, Atsugi (JP)

( * ) Notice: Subject to any disclaimer, the term of this patent is extended or adjusted under 35 U.S.C. 154(b) by 41 days.

(21) Appl. No.: 18/833,028

(22) PCT Filed: Jan. 31, 2023

(86) PCT No.: PCT/EP2023/052267
§ 371 (c)(1),
(2) Date: Jul. 25, 2024

(87) PCT Pub. No.: WO2023/148148
PCT Pub. Date: Aug. 10, 2023

(65) Prior Publication Data
US 2025/0113117 A1      Apr. 3, 2025

(30) Foreign Application Priority Data
Feb. 1, 2022    (EP) .................................... 22154426

(51) Int. Cl.
*H04N 25/773*        (2023.01)
*H04N 23/10*         (2023.01)
(Continued)

(52) U.S. Cl.
CPC ................................ *H04N 25/773* (2023.01)

(58) Field of Classification Search
CPC ...... H04N 25/773; H04N 23/10; H04N 25/79; H10F 39/802; H10F 39/809; H10F 39/8027
See application file for complete search history.

(56) References Cited

U.S. PATENT DOCUMENTS

2014/0197303 A1      7/2014  Kelly et al.
2015/0163429 A1*     6/2015  Dai ....................... H04N 25/581
                                                           348/295
2023/0369373 A1*    11/2023  Iwata ................... H04N 25/773

FOREIGN PATENT DOCUMENTS

EP           2312829 A2      4/2011
EP           3499873 A2      6/2019
(Continued)

OTHER PUBLICATIONS

International Search Report and Written Opinion mailed on Apr. 12, 2023, received for International Application No. PCT/EP2023/052267, filed on Jan. 31, 2023, 11 pages.
(Continued)

*Primary Examiner* — Ahmed A Berhan
(74) *Attorney, Agent, or Firm* — XSENSUS LLP

(57)            ABSTRACT

The disclosure provides an imaging device that includes an array of photosensitive elements and a first counter for counting photon detection events received from a first group of photosensitive elements; wherein, in a first operation mode, the first counter is connected to a first subgroup of the first group of photosensitive elements and wherein, in a second operation mode, the first counter is connected to a second subgroup of the first group of photosensitive elements.

20 Claims, 11 Drawing Sheets

(51) Int. Cl.
    *H04N 25/79*        (2023.01)
    *H10F 39/00*        (2025.01)

(56)          References Cited

FOREIGN PATENT DOCUMENTS

| | | | |
|---|---|---|---|
| EP | 3562147 | A1 | 10/2019 |
| JP | 3928840 | B2 | 6/2007 |
| KR | 102039963 | B1 | 11/2019 |

OTHER PUBLICATIONS

Hutchings et al., "A Reconfigurable 3-D-Stacked SPAD Imager With In-Pixel Histogramming for Flash Lidar or High-Speed Time-of-Flight Imaging", IEEE Journal of Solid-State Circuits, vol. 54, No. 11, Nov. 1, 2019, pp. 2947-2956.

\* cited by examiner

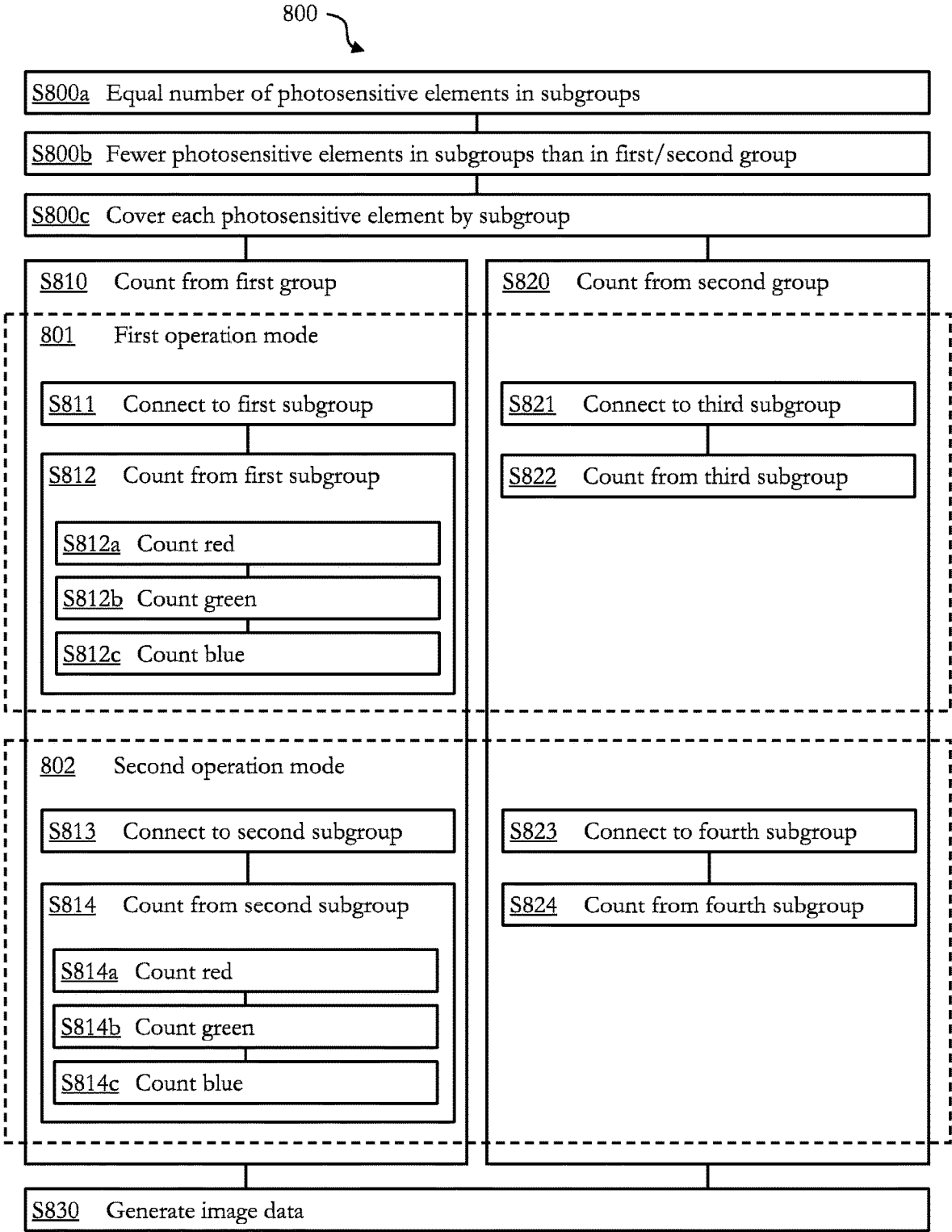

800

S800a  Equal number of photosensitive elements in subgroups

S800b  Fewer photosensitive elements in subgroups than in first/second group

S800c  Cover each photosensitive element by subgroup

S810  Count from first group

801  First operation mode

S811  Connect to first subgroup

S812  Count from first subgroup

S812a  Count red

S812b  Count green

S812c  Count blue

S820  Count from second group

S821  Connect to third subgroup

S822  Count from third subgroup

802  Second operation mode

S813  Connect to second subgroup

S814  Count from second subgroup

S814a  Count red

S814b  Count green

S814c  Count blue

S823  Connect to fourth subgroup

S824  Count from fourth subgroup

S830  Generate image data

Fig. 12

IMAGING DEVICE INCLUDING AN ARRAY OF PHOTOSENSITIVE ELEMENTS AND A FIRST COUNTER FOR COUNTING PHOTON DETECTION EVENTS RECEIVED FROM A FIRST GROUP OF PHOTOSENSITIVE ELEMENTS AND METHOD THEREFORE

CROSS-REFERENCE TO RELATED APPLICATIONS

The present application is a national stage application, pursuant to 35 U.S.C. § 371, of International Patent Application No. PCT/EP2023/052267, filed Jan. 31, 2023, which claims priority from European Patent Application No. 22154426.5, filed Feb. 1, 2022, the entire contents of each are incorporated herein by reference.

TECHNICAL FIELD

The present disclosure generally pertains to an imaging device and a method.

TECHNICAL BACKGROUND

Known types of digital image sensors are charge-coupled devices (CCD) and complementary metal-oxide-semiconductor (CMOS) active-pixel sensors.

Recently, image sensors that include an array of photosensitive elements based on single-photon avalanche diodes (SPAD) are emerging.

In a SPAD of a photosensitive element, a single free charge carrier injected by a single photon can cause an avalanche of free charge carriers, thus making the single photon detectable.

A counter of the photosensitive element counts the avalanches and, thus, can provide the number of detected photons.

Although there exist techniques for an imaging device, it is generally desirable to provide an improved imaging device and an improved method.

SUMMARY

According to a first aspect, the disclosure provides an imaging device comprising: an array of photosensitive elements; and a first counter for counting photon detection events received from a first group of photosensitive elements; wherein, in a first operation mode, the first counter is connected to a first subgroup of the first group of photosensitive elements and wherein, in a second operation mode, the first counter is connected to a second subgroup of the first group of photosensitive elements.

According to a second aspect, the disclosure provides a method for operating an imaging device, comprising: counting, with a first counter, photon detection events received from a first group of photosensitive elements of an array of photosensitive elements; connecting, in a first operation mode, the first counter to a first subgroup of the first group of photosensitive elements; and connecting, in a second operation mode, the first counter to a second subgroup of the first group of photosensitive elements.

Further aspects are set forth in the dependent claims, the drawings and the following description.

BRIEF DESCRIPTION OF THE DRAWINGS

Embodiments are explained by way of example with respect to the accompanying drawings, in which:

FIG. 11 shows a block diagram of a three-by-three binning in an array of photosensitive elements according to an embodiment; and FIG. 12 shows a flow diagram of a method for operating an imaging device according to an embodiment.

DETAILED DESCRIPTION OF EMBODIMENTS

Figure 1:
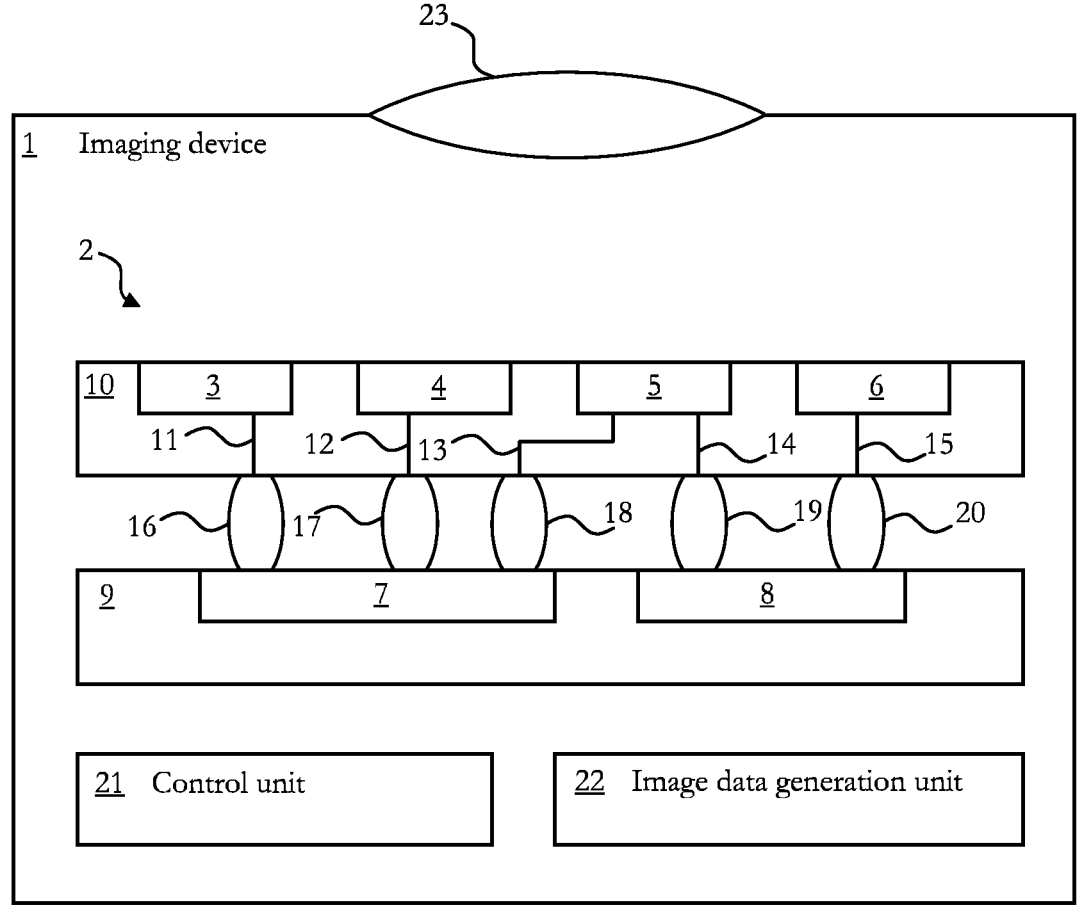
FIG. 1 shows a block diagram of an imaging device according to an embodiment.

Before a detailed description of the embodiments under reference of FIG. 1 is given, general explanations are made.

As indicated in the outset, known types of digital image sensors are charge-coupled devices (CCD) and complementary metal-oxide-semiconductor (CMOS) active-pixel sensors.

Recently, image sensors that include an array of photosensitive elements based on single-photon avalanche diodes (SPAD) are emerging.

In a SPAD of a photosensitive element, a single free charge carrier injected by a single photon can cause an avalanche of free charge carriers, thus making the single photon detectable.

Each SPAD-based photosensitive element has a counter that counts the avalanches and, thus, can provide the number of detected photons.

In some instances, a SPAD-based photosensitive element requires a dedicated read-out counter with enough bits for high image depth, and the required number of bits dictates a minimum size of the counter. This causes each photosensitive element to occupy at least a space corresponding to the minimum size of the counter as each counter needs to be located below the corresponding SPAD-based photosensitive element.

Therefore, a density of photosensitive elements and, thus, an image resolution is limited by the size of the counter in some instances.

In some embodiments, it is desirable to lower a size of a photosensitive element and a space occupied per photosensitive element in an imaging device based on SPADs for increasing a density of SPAD-based photosensitive elements and, thus, a resolution of an image generated by the imaging device.

Consequently, some embodiments of the present invention pertain to an imaging device that includes an array of photosensitive elements; and a first counter for counting photon detection events received from a first group of photosensitive elements; wherein, in a first operation mode, the first counter is connected to a first subgroup of the first group of photosensitive elements and wherein, in a second operation mode, the first counter is connected to a second subgroup of the first group of photosensitive elements.

By counting photon detection events received from the first group of photosensitive elements with the first counter, the photosensitive elements of the first group of photosensitive elements may share the first counter, and it may not be necessary to provide a dedicated counter in each photosensitive element. Therefore, a space occupied per photosensitive element may be smaller than the first counter, and a density of photosensitive elements may be increased, resulting in a higher image resolution.

Connecting the first counter to the first subgroup (or, equivalently, connecting the first subgroup to the first counter) may include establishing an electrical connection between the first counter and each photosensitive element of the first subgroup such that electrical signals indicating a photon detection event in any one of the photosensitive elements of the first subgroup are provided to the first counter.

Likewise, connecting the first counter to the second subgroup (or, equivalently, connecting the second subgroup to the first counter) may include establishing an electrical connection between the first counter and each photosensitive element of the second subgroup such that electrical signals indicating a photon detection event in any one of the photosensitive elements of the second subgroup are provided to the first counter.

By connecting the first counter in different operation modes to different subgroups of the first group of photosensitive elements, the first counter may count, in each respective operation mode, photon detection events from each photosensitive element of the corresponding subgroup, an area in which photons are detected may be increased, resulting in a higher number of detected photons, with respect to a single photosensitive element. A number of photons missed during recovery of a SPAD after a photon detection event may also be reduced as compared to a single photosensitive element because, during recovery of the SPAD of one photosensitive element of a subgroup, the other photosensitive element(s) of the subgroup may still be sensitive to incoming photons. Furthermore, an image resolution below subgroup size may be realized by providing an overlap between subgroups.

The first subgroup may be a contiguous subset of the first group of photosensitive elements. Likewise, the second subgroup may be a contiguous subset of the first group of photosensitive elements.

The values counted by the first counter in the first operation mode and in the second operation mode, i.e., the numbers of photon detection events in the first subgroup and in the second subgroup, respectively, may be associated with different pixels of an image generated by the imaging device.

In some embodiments, the first counter is provided in a first semiconductor layer, the array of photosensitive elements is provided in a second semiconductor layer, and the first counter overlaps an area in which the first subgroup is provided.

For example, the first semiconductor layer may be provided on a side of the second semiconductor layer that is opposite to a light incidence side of the second semiconductor layer.

Thus, the first counter may be provided close to the first group of photosensitive elements, which may allow reducing a parasitic capacitance of a wiring that connects the first counter to the first group of photosensitive elements and reducing a latency in counting photon detection events from the first group of photosensitive elements.

By providing the first counter in another semiconductor layer than the array of photosensitive elements, a larger area of the second semiconductor layer may be available for (the SPAD of) the photosensitive elements, which may allow increasing a light sensitivity of the array of photosensitive elements by covering a larger area with SPAD.

In some embodiments, the first semiconductor layer is provided on a first chip, and the second semiconductor layer is provided on a second chip.

For example, the first chip and the second chip may be separate semiconductor chips. The first chip and the second chip may be fabricated separately and then laminated together. The first counter may be coupled directly to the first group of photosensitive elements, for example via solder bumps.

In some embodiments, each subgroup of the first group of photosensitive elements is configured to be individually connected to the first counter.

For example, a configuration of the first group of photosensitive elements may allow connecting each subgroup of the first group of photosensitive elements to the first counter without connecting, to the first counter, any photosensitive element that is not included in the corresponding subgroup.

Thus, photon detection events may be counted separately, e.g., sequentially, for each subgroup of the first group of photosensitive elements by the first counter, so that pixels of an image generated by the imaging device may be based on numbers of photon detection events of single subgroups of the first group of photosensitive elements.

In some embodiments, the imaging device further includes an image data generation unit configured to generate image data, wherein a first pixel of the image data is based on a number of photon detection events of the first subgroup in the first operation mode, and a second pixel of the image data is based on a number of photon detection events of the second subgroup in the second operation mode.

The image data may represent an image generated by the imaging device based on photons detected by the array of photosensitive elements. A value of a pixel of the image may be based on a number of photon detection events in a single subgroup of the first group of photosensitive elements counted in a corresponding operation mode.

In some embodiments, the imaging device further includes a second counter for counting photon detection events received from a second group of photosensitive elements of the array of photosensitive elements; wherein, in the first operation mode, the second counter is connected to a third subgroup of the second group of photosensitive elements and, in the second operation mode, the second counter is connected to a fourth subgroup of the second group of photosensitive elements; and wherein the third subgroup of the second group of photosensitive elements overlaps the second subgroup of the first group of photosensitive elements in at least one photosensitive element.

For example, at least one photosensitive element may be included in both the second subgroup of the first group of photosensitive elements and the third subgroup of the second group of photosensitive elements.

Overlapping subgroups may allow an image resolution, in an image generated by the imaging device, that is finer than a size of a subgroup of the first or second group of photosensitive elements.

The overlapping may allow acquiring image data by pixel shift.

In some embodiments, each of the first subgroup and the second subgroup includes at least two photosensitive elements; and the first subgroup and the second subgroup overlap in at least one photosensitive element.

As mentioned above, overlapping subgroups may allow pixel shift for obtaining an image resolution that is higher than an image resolution obtained by non-overlapping photosensitive elements.

In some embodiments, each of the first subgroup and the second subgroup includes at least two rows of photosensitive elements and at least two columns of photosensitive elements.

The first subgroup and the second subgroup may be rectangular, i.e., each respective one of the first subgroup and the second subgroup may include such photosensitive elements of the array of photosensitive elements that are included in both a contiguous set of rows and a contiguous set of columns of the array of photosensitive elements.

In some embodiments, each of the first subgroup and the second subgroup is quadratic.

For example, a number of rows of photosensitive elements included in the first or second subgroup may equal a number of columns of photosensitive elements included in the respective first or second subgroup.

A quadratic shape of the first and second subgroup may, for example, correspond to a shape of pixels in an image generated by the imaging device.

In some embodiments, each of the first subgroup and the second subgroup includes two rows of photosensitive elements and two columns of photosensitive elements.

For example, two-by-two binning of photosensitive elements may be performed.

In some embodiments, each of the first subgroup and the second subgroup includes three rows of photosensitive elements and three columns of photosensitive elements.

For example, three-by-three binning of photosensitive elements may be performed.

In some embodiments, each photosensitive element of the first group of photosensitive elements includes a first subelement for detecting light of a first color and a second subelement for detecting light of a second color; and the first counter includes a first color counter for counting photon detection events received from the first subelement and a second color counter for counting photon detection events received from the second subelement.

For example, color filters may be provided in front of the SPADs of the first and second subelements of the photosensitive elements of the first group of photosensitive elements such that only light with a predetermined color reaches the respective SPADs. The color filters may, for example, include a bandpass filter configured to transmit light of a predetermined wavelength interval, a longpass filter configured to transmit light of a wavelength not shorter than a predetermined cuton wavelength or a shortpass filter configured to transmit light of a wavelength not longer than a predetermined cutoff wavelength.

For example, instead of or in addition to providing a color filter in front of the SPADs of the first and second subelements of the photosensitive elements, a material of a depletion region in a SPAD of the first and/or second subelement may be chosen such that ionization (i.e., creation of a free charge carrier) is particularly sensitive to a specific wavelength interval.

For example, the first subelement may be configured to detect red light, e.g., photons with an average wavelength between 630 to 700 nanometers, the second subelement may be configured to detect green light, e.g., photons with an average wavelength between 500 to 560 nanometers, and a third subelement of a photosensitive element may be configured to detect blue light, e.g., photons with an average wavelength between 450 to 475 nanometers. The disclosure is not limited to the mentioned wavelength values; and the skilled person may find various combinations of wavelength intervals to be detected by different subelements of a photosensitive element.

Each color counter of the first counter may include a separate register for storing a number of detected photons. For example, the first color counter may count photon detection events from the first subelements of the photosensitive elements of the first group of photosensitive elements and store the counted number of photon detection events in its separate register. Likewise, the second color counter may count photon detection events from the second subelements of the photosensitive elements of the first group of photosensitive elements and store the counted number of photon detection events in its separate register.

Thus, the imaging device may generate a color image, e.g. a Red-Green-Blue (RGB) image, based on photon detection events from the different subelements of the photosensitive elements counted by the corresponding color counters of the first counter.

In some embodiments, all subgroups of the first group of photosensitive elements include an equal number of photosensitive elements; and each subgroup of the first group of photosensitive elements includes fewer photosensitive elements than the first group of photosensitive elements.

For example, each subgroup of the first group of photosensitive elements may be rectangular or may be quadratic.

Each subgroup of the first group of photosensitive elements may include less photosensitive elements than the first group of photosensitive elements such that the first group of photosensitive elements may include several subgroups that are pair-wise non-identical.

Some subgroups of the first group of photosensitive elements may overlap. As indicated above, this may allow a finer image resolution, of an image generated by the imaging device, than for non-overlapping subgroups.

In some embodiments, a number of subgroups of the first group of photosensitive elements is chosen such that each photosensitive element of the first group of photosensitive elements is covered by at least one subgroup of the first group of photosensitive elements.

Thus, each photosensitive element of the first group of photosensitive elements may be connected to the first counter in at least one operation mode.

The photosensitive elements of the first group of photosensitive elements may be covered by different numbers of subgroups. For example, a photosensitive element may be covered by one subgroup, another photosensitive element may be covered by two subgroups, yet another photosensitive element may be covered by three subgroups, yet another photosensitive element may be covered by four groups, etc.

In some embodiments, the subgroups of the first group of photosensitive elements are sequentially connected to the first counter in respective operation modes.

For example, the first subgroup may be connected to the first counter in the first operation mode, then the second subgroup may be connected to the first counter in the second operation mode, and then any further subgroup of the first group of photosensitive elements may be connected to the first counter in a respective subsequent operation mode. For each point in time, only one subgroup may be connected to the first counter.

Thus, photon detection events from all subgroups of the first group of photosensitive elements may be counted by the first counter.

The subgroups of the first group of photosensitive elements may each be connected for a short time and in a fast sequence such that a change in a scene imaged by the imaging device during the sequence may be negligible, thus providing an approximately static image of the scene based on subsequently counting photon detection events of the different subgroups of the first group of photosensitive elements.

In some embodiments, each photosensitive element of the first group of photosensitive elements includes a Single Photon Avalanche Diode (SPAD).

A SPAD may be capable of detecting single photons such that imaging of a scene may be possible even under low light conditions.

In some embodiments, an exposure time of each operation mode (i.e., of each subgroup) may be reduced in comparison to a state-of-the-art imaging device since a SPAD area may be increased by binning.

For example, for two-by-two binning of photosensitive elements, a SPAD area may practically correspond to four times a size of a state-of-the-art photosensitive element, such that an exposure time of an array of photosensitive elements according to an embodiment may be reduced to a quarter of an exposure time of the state of the art, where no pixel shift and no binning is performed. Due to the reduced exposure time, in some embodiments, an image acquisition may be faster because a number of read-outs required for acquiring image data may remain equal compared to a known image sensor that does not perform pixel shift.

Some embodiments pertain to a method for operating an imaging device, wherein the method includes: counting, with a first counter, photon detection events received from a first group of photosensitive elements of an array of photo- sensitive elements; connecting, in a first operation mode, the first counter to a first subgroup of the first group of photo- sensitive elements; and connecting, in a second operation mode, the first counter to a second subgroup of the first group of photosensitive elements.

The imaging device may be configured according to any one of the embodiments described above. The variations, examples, technical effects and detailed descriptions pro- vided above for the embodiments of an imaging device apply correspondingly to the embodiments of the method for operating an imaging device.

In some embodiments, the connecting of the first counter to the first subgroup includes individually connecting the first subgroup to the first counter; and the connecting of the first counter to the second subgroup includes individually connecting the second subgroup to the first counter.

In some embodiments, the counting of photon detection events includes: counting, with the first counter, a number of photon detection events received, in the first operation mode, from the first subgroup; and counting, with the first counter, a number of photon detection events received, in the second operation mode, from the second subgroup.

In some embodiments, the method further includes gen- erating image data, wherein a first pixel of the image data is based on a number of photon detection events of the first subgroup in the first operation mode, and a second pixel of the image data is based on a number of photon detection events of the second subgroup in the second operation mode.

In some embodiments, the method further includes: counting, with a second counter, photon detection events received from a second group of photosensitive elements of the array of photosensitive elements; connecting, in the first operation mode, the second counter to a third subgroup of the second group of photosensitive elements; and connect- ing, in the second operation mode, the second counter to a fourth subgroup of the second group of photosensitive elements; wherein the third subgroup of the second group of photosensitive elements overlaps the second subgroup of the first group of photosensitive elements in at least one pho- tosensitive element.

In some embodiments, the counting of photon detection events includes: counting, with the second counter, a number of photon detection events received, in the first operation mode, from the third subgroup; and counting, with the second counter, a number of photon detection events received, in the second operation mode, from the fourth subgroup.

In some embodiments, the counting of photon detection events includes: counting, with a first color counter of the first counter, a number of photon detection events received, in the first operation mode, from first subelements of the photosensitive elements of the first subgroup; counting, with a second color counter of the first counter, a number of photon detection events received, in the first operation mode, from second subelements of the photosensitive ele- ments of the first subgroup; counting, with the first color counter, a number of photon detection events received, in the second operation mode, from first subelements of the pho- tosensitive elements of the second subgroup; and counting, with the second color counter, a number of photon detection events received, in the second operation mode, from second subelements of the photosensitive elements of the second subgroup.

In some embodiments, the method further includes: including, in all subgroups of the first group of photosensi- tive elements, an equal number of photosensitive elements; and including, in each subgroup of the first group of pho- tosensitive elements, fewer photosensitive elements than in the first group of photosensitive elements.

In some embodiments, the method further includes choos- ing a number of subgroups of the first group of photosen- sitive elements such that each photosensitive element of the first group of photosensitive elements is covered by at least one subgroup of the first group of photosensitive elements.

In some embodiments, the method includes connecting the subgroups of the first group of photosensitive elements sequentially to the first counter in respective operation modes.

In some embodiments, the method further includes detect- ing, in each photosensitive element of the first group of photosensitive elements, photons with a Single Photon Ava- lanche Diode.

The methods as described herein are also implemented in some embodiments as a computer program causing a com- puter and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

Returning to FIG. 1, there is shown a block diagram of an imaging device 1 according to an embodiment.

The imaging device 1 includes an array 2 of photosensitive elements including the photosensitive elements 3 to 6, each including a Single-Photon Avalanche Diode (SPAD). The photosensitive elements 3 to 5 are coupled to a first counter 7. The photosensitive elements 5 and 6 are coupled to a second counter 8.

In a first operation mode, the first counter 7 is connected to the photosensitive elements 3 and 4, and the second counter 8 is connected to the photosensitive elements 5 and 6. In a second operation mode, the first counter 7 is connected to the photosensitive elements 4 and 5, and the second counter is connected to the photosensitive element 6. In each operation mode, both the first counter 7 and the second counter 8 count photon detection events from the SPADs of the respective photosensitive elements 3 to 6 to which they are connected in the respective operation mode.

The first counter 7 and the second counter 8 are provided in a first semiconductor layer provided on a first semiconductor chip 9, and the array 2 of photosensitive elements is provided in a second semiconductor layer provided on a second semiconductor chip 10. The first counter 7 overlaps the photosensitive elements 3 and 4, and the second counter 8 overlaps the photosensitive elements 5 and 6.

The first semiconductor chip 9 and the second semiconductor chip 10 are laminated together. The photosensitive elements 3 to 6 are coupled to the first counter 7 and the second counter 8, respectively, by through electrodes 11 to 15 and by solder bumps 16 to 20.

The imaging device 1 further includes a control unit 21 for controlling an operation of the first counter 7 and of the second counter 8.

The imaging device 1 also includes an image data generation unit 22 for generating image data. The image data represent an image, wherein values of pixels of the image are based on a number of counted photon detection events counted by the first counter 7 or the second counter 8.

The imaging device 23 includes a lens 23 for focusing incoming light on the array 2 of photosensitive elements.

Figure 2:
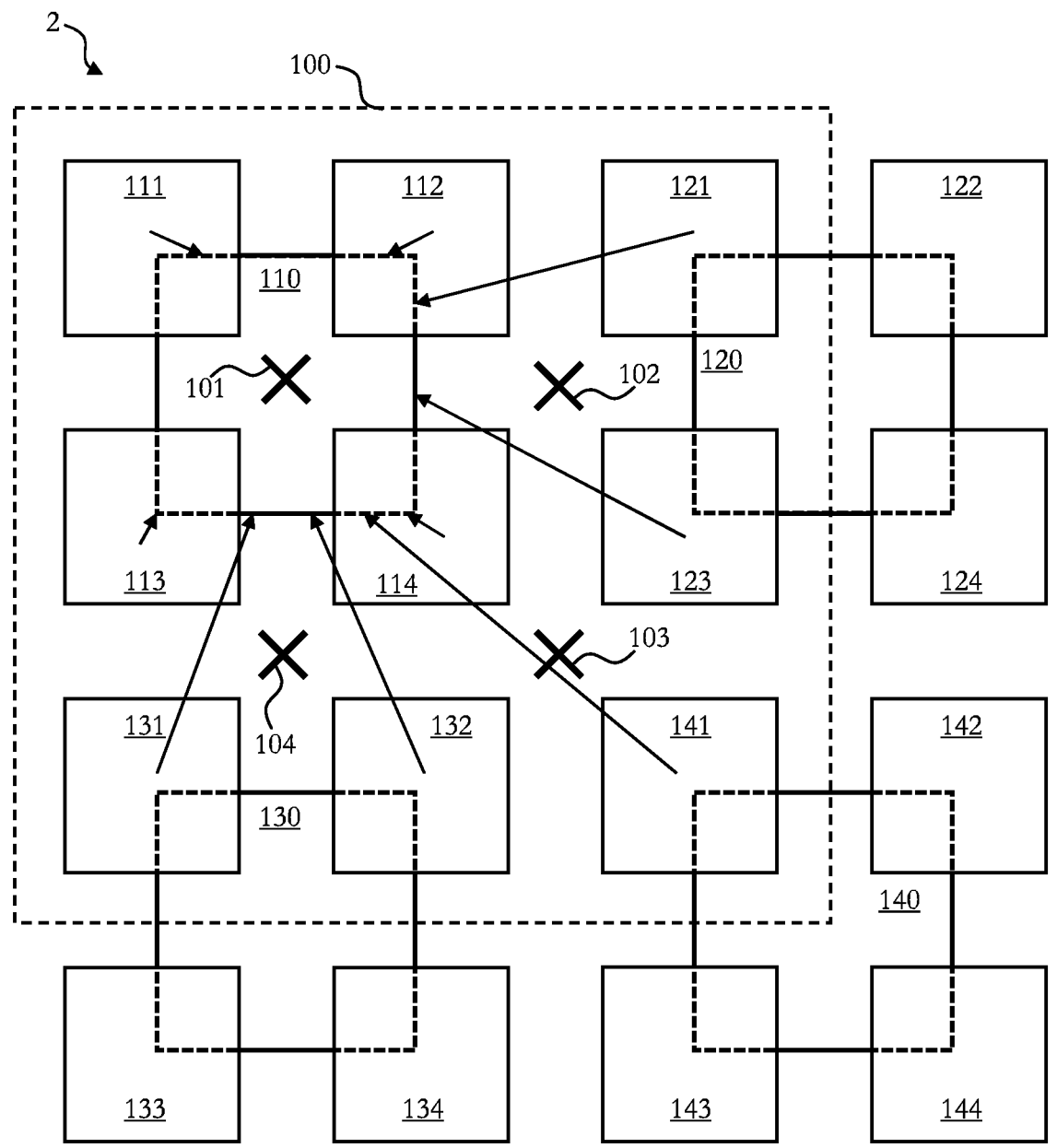
FIG. 2 illustrates a block diagram of an array of photosensitive elements and of counters in a top view according to an embodiment.

FIG. 2 illustrates a block diagram of the array 2 of photosensitive elements and of counters in a top view according to an embodiment.

The array 2 of photosensitive elements includes the photosensitive elements 111 to 114, 121 to 124, 131 to 134 and 141 to 144, each of which includes a SPAD for detecting incoming photons.

The photosensitive elements 111, 112, 121 and 122 correspond to the photosensitive elements 3 to 6, respectively, of FIG. 1.

The counters 110, 120, 130 and 140 are provided in semiconductor layer below (i.e., opposite to a light incidence side of) the array 2 of photosensitive elements. The counter 110 corresponds to the first counter 7 of FIG. 1 and overlaps the photosensitive elements 111, 112, 113 and 114. The counter 120 corresponds to the second counter 8 of FIG. 1 and overlaps the photosensitive elements 121, 122, 123 and 124. The counter 130 overlaps the photosensitive elements 131, 132, 133 and 134. The counter 140 overlaps the photosensitive elements 141, 142, 143 and 144.

A group 100 of photosensitive elements of the array 2 of photosensitive elements includes nine photosensitive elements, namely the photosensitive elements 111, 112, 113, 114, 121, 123, 131, 132 and 141 as indicated by a dashed line in FIG. 2.

The counter 110 is coupled to the photosensitive elements 111 to 114, 121, 123, 131, 132 and 141 of the group 100 of photosensitive elements, as indicated in FIG. 2 by arrows. The counter 110 can be connected to and disconnected from the photosensitive elements 111 to 114, 121, 123, 131, 132 and 141, to which it is coupled, by switching corresponding connections.

In a first operation mode, the counter 110 is connected to the photosensitive elements 111, 112, 113 and 114, which constitute a first subgroup of the group 100 of photosensitive elements and have a center of gravity 101.

In a second operation mode, the counter 100 is connected to the photosensitive elements 112, 114, 121 and 123, which constitute a second subgroup of the group 100 of photosensitive elements and have a center of gravity 102.

In a third operation mode, the counter 100 is connected to the photosensitive elements 114, 123, 132 and 141, which constitute a third subgroup of the group 100 of photosensitive elements and have a center of gravity 103.

In a fourth operation mode, the counter 100 is connected to the photosensitive elements 113, 114, 131 and 132, which constitute a fourth subgroup of the group 100 of photosensitive elements and have a center of gravity 104.

In each operation mode, the counter 100 counts photon detection events from the subgroup of photosensitive elements to which it is connected in the respective operation mode.

Likewise, the counters 120, 130 and 140 are each coupled to nine photosensitive elements, including photosensitive elements not depicted in FIG. 2, and are connected to various subgroups thereof in the various operation modes.

For example, the counter 120 is coupled to a group of photosensitive elements that includes the photosensitive elements 121, 122, 123, 124, 141 and 142. In the first operation mode, the counter 120 is connected to the photosensitive elements 121, 122, 123 and 124. In the second operation mode, the counter 120 is connected to the photosensitive elements 122 and 124 as well as to photosensitive elements not depicted in FIG. 2. In the third operation mode, the counter 120 is connected to the photosensitive elements 124 and 142 as well as to photosensitive elements not depicted in FIG. 2. In the fourth operation mode, the counter 120 is connected to the photosensitive elements 123, 124, 141 and 142.

That is, each counter 110, 120, 130 and 140 is coupled to a respective group of nine photosensitive elements of the array 2 of photosensitive elements, and is connected, in each operation mode, to another subgroup of four photosensitive elements among the respective group of nine photosensitive elements for counting photon detection events therefrom. The photosensitive elements of each of the groups are arranged quadratically in three rows and three columns, and the subgroups are arranged quadratically in two rows and two columns. Vertically or horizontally adjacent groups overlap by one row or column of photosensitive elements, and vertically or horizontally adjacent subgroups (of the same group or of different groups) overlap by one row or column of photosensitive elements. Diagonally adjacent groups or subgroups overlap by one photosensitive element.

Figure 3:
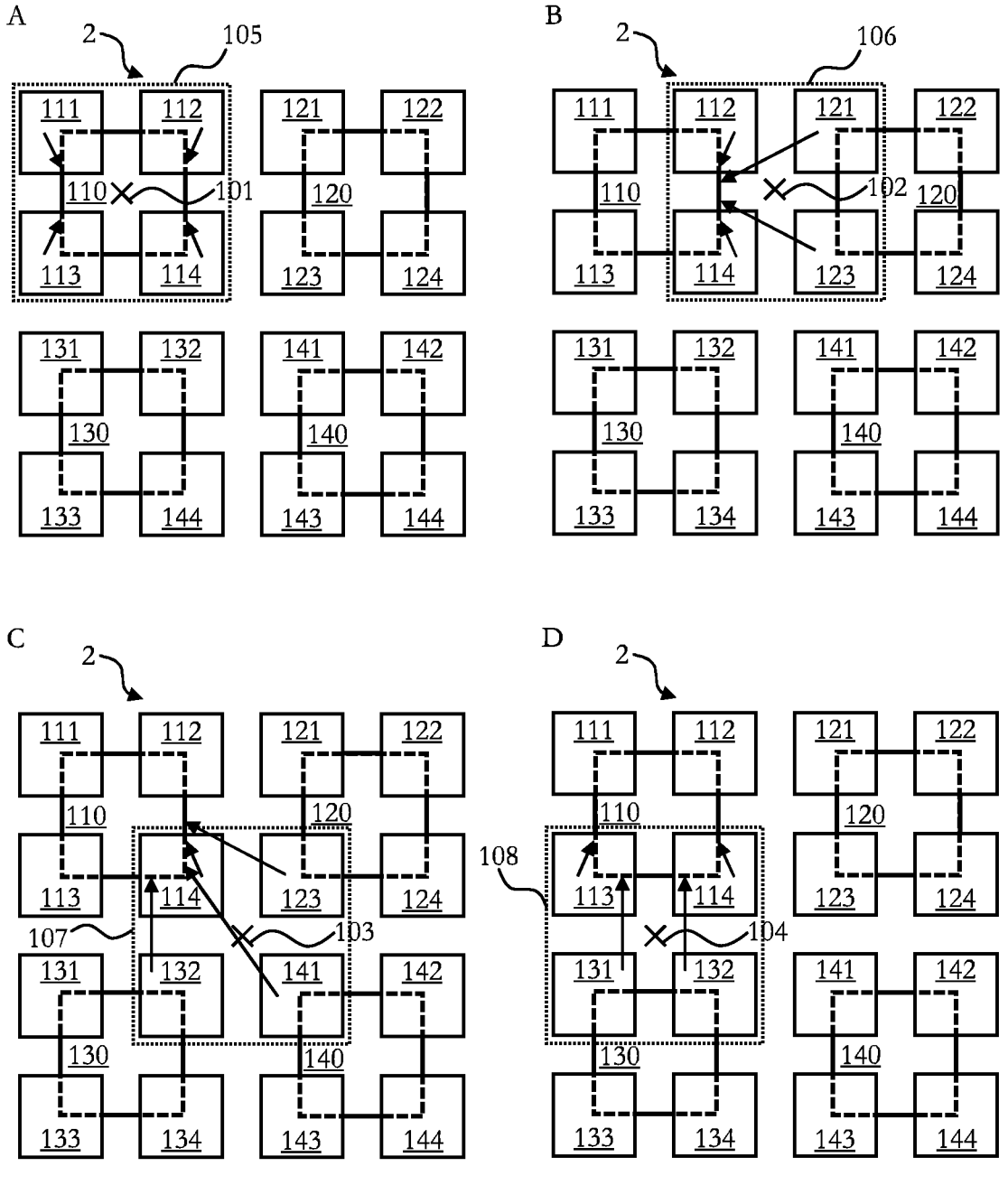
FIG. 3 illustrates a block diagram of a readout sequence of a counter in four operation modes according to an embodiment.

FIG. 3 illustrates a block diagram of a readout sequence of the counter 110 in four operation modes according to an embodiment.

Part A of FIG. 3 shows the first operation mode, in which the first subgroup 105 (illustrated by a dotted line in part A), which includes photosensitive elements 111, 112, 113 and 114, is connected to the counter 110.

Part B of FIG. 3 shows the second operation mode, in which the second subgroup 106 (illustrated by a dotted line in part B), which includes photosensitive elements 112, 114, 121 and 123, is connected to the counter 110.

Part C of FIG. 3 shows the third operation mode, in which the third subgroup 107 (illustrated by a dotted line in part C), which includes photosensitive elements 114, 123, 132 and 141, is connected to the counter 110.

Part D of FIG. 3 shows the fourth operation mode, in which the fourth subgroup 108 (illustrated by a dotted line in part D), which includes photosensitive elements 113, 114, 131 and 132, is connected to the counter 110.

Thus, four subgroups 105 to 108 with a same size and shape but different centers of gravity can be connected to one counter 110 in different operation modes.

Figure 4:
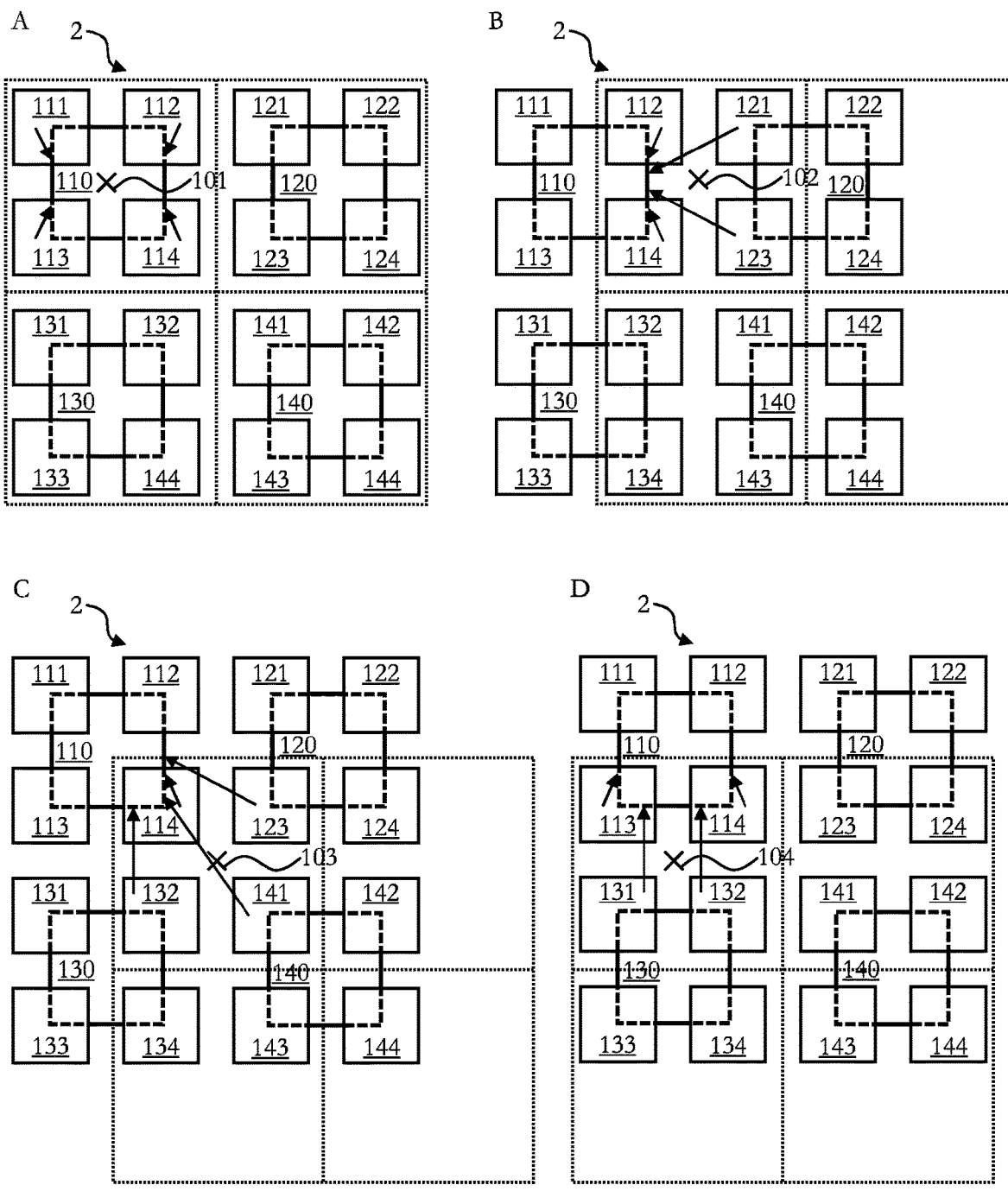
FIG. 4 illustrates a block diagram of a readout sequence of four counters in four operation modes according to an embodiment.

FIG. 4 illustrates a block diagram of a readout sequence of the four counters 110, 120, 130 and 140 in four operation modes according to an embodiment.

FIG. 4 differs from FIG. 3 in that, for each of the four counters 110, 120, 130 and 140, a subgroup to which the respective one of the four counters 110, 120, 130 and 140 is connected in each operation mode is shown.

The dotted grid in FIG. 4 illustrates the four subgroups, wherein an upper left cell of the dotted grid indicates a subgroup that is connected to the counter 110, an upper right cell of the dotted grid indicates a subgroup that is connected to the counter 120, a lower left cell of the dotted grid indicates a subgroup that is connected to the counter 130, and a lower right cell of the dotted grid indicates a subgroup that is connected to the counter 140.

As in FIG. 3, part A of FIG. 4 corresponds to the first operation mode, part B of FIG. 4 corresponds to the second operation mode, part C of FIG. 4 corresponds to the third operation mode, and part C of FIG. 4 corresponds to the fourth operation mode.

Thus, in each operation mode, each counter 110, 120, 130 and 140 can be connected to a different subgroup, wherein all subgroups have a same size and shape but different centers of gravity.

The number of photon detection events counted by each counter 110, 120, 130 and 140 in an operation mode corresponds to a sum of photon detection events over four photosensitive elements with different centers of gravity per operation mode. A pitch of the centers of gravity corresponds to a half of a counter pitch.

By aligning, in an image generated by the imaging device 1, pixels whose values are based on the numbers of photon detection events counted for the different subgroups such that an alignment (i.e., a position relative to each other) of the pixels corresponds to an alignment (i.e., a position relative to each other) of the corresponding centers of gravity of the subgroups, an image resolution is improved in some embodiments with respect to an image resolution obtained in instances where pixels are only based on non-overlapping subgroups (e.g., only subgroups that correspond to the first operation mode).

Figure 5:
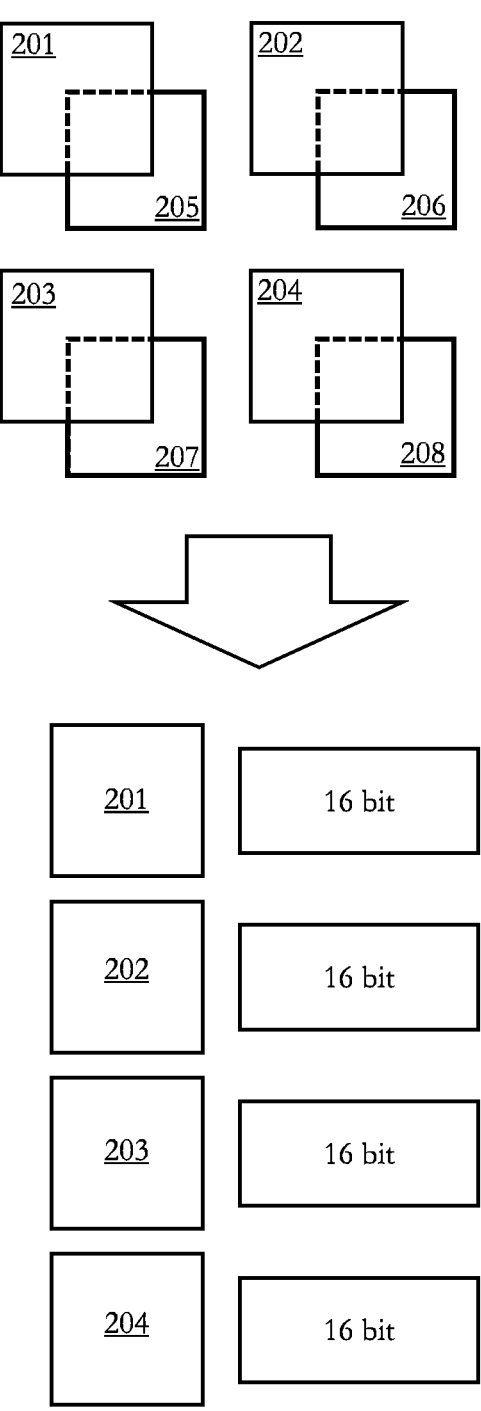
FIG. 5 illustrates a block diagram of a bit usage in a state-of-the-art image sensor that is based on SPADs.

FIG. 5 illustrates a block diagram of a bit usage in a state-of-the-art image sensor that is based on SPADs.

The state-of-the-art image sensor includes SPAD-based photosensitive elements 201 to 204. Each photosensitive element 201 to 204 is connected to a separate counter 205 to 208. The photosensitive element 201 is connected to the counter 205. The photosensitive element 202 is connected to the counter 206. The photosensitive element 203 is connected to the counter 207. The photosensitive element 204 is connected to the counter 208.

For acquiring an image, each photosensitive element 201 to 204 is read out once by its corresponding counter 205 to 208. Therefore, in an exemplary case where the number of photon detection events from each of the photosensitive elements 201 to 204 counted by the respective counter 205 to 208 is stored in a 16-bit register, a separate 16-bit register is required for each photosensitive element 201 to 204 to acquire an image with a high resolution.

Figure 6:
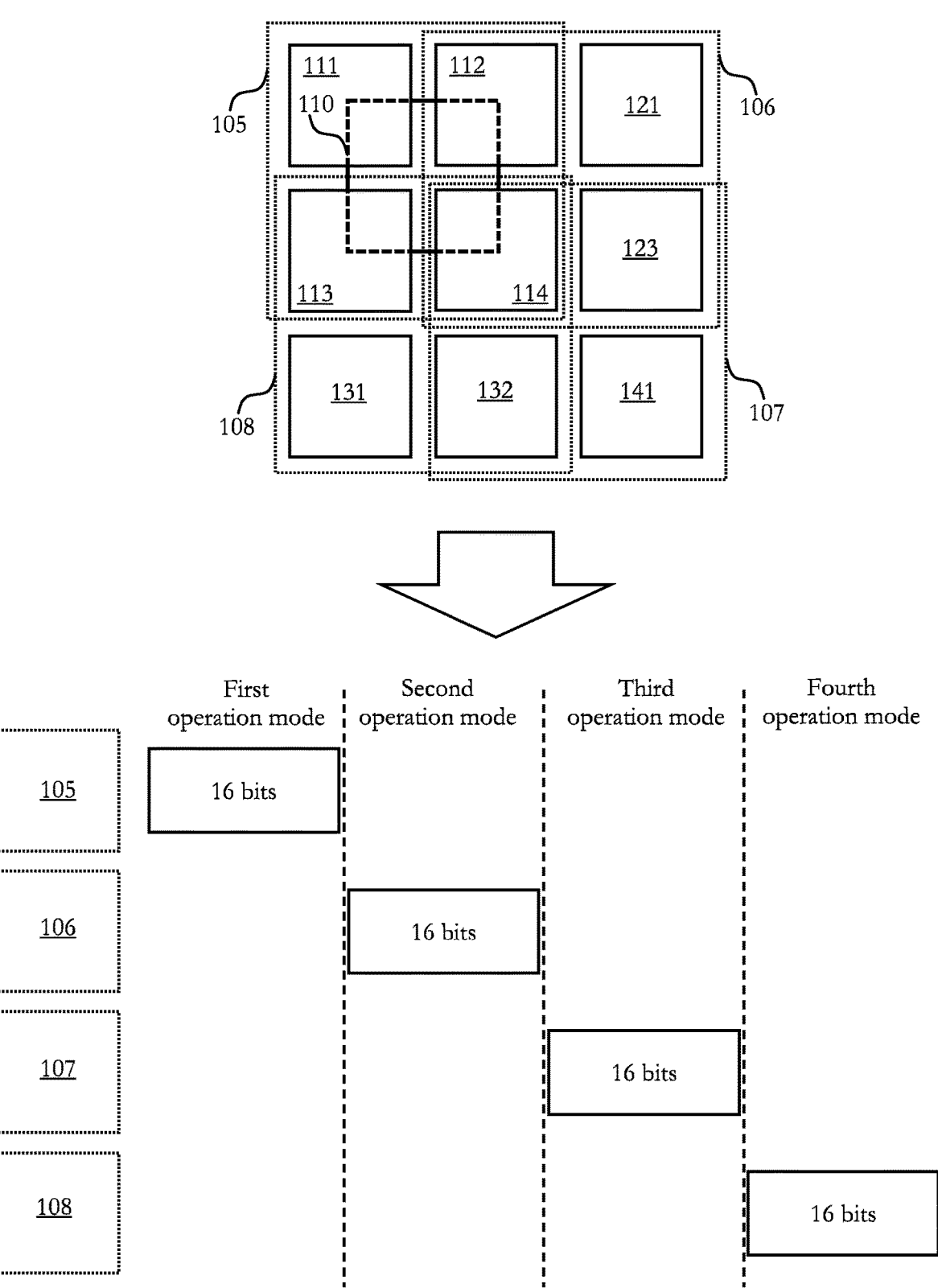
FIG. 6 illustrates a block diagram of a bit usage in an image sensor that is based on SPADs according to an embodiment.

FIG. 6 illustrates a block diagram of a bit usage in an image sensor that is based on SPADs according to an embodiment.

The image sensor is an example for an image sensor included in the imaging device 1 and includes the array 2 of photosensitive elements as well as the counter 110, as described above under reference to FIGS. 2 to 4.

In the first operation mode, the counter 110 counts photon detection events from the first subgroup 105, which includes the photosensitive elements 111 to 114. In the second operation mode, the counter 110 counts photon detection events from the second subgroup 106, which includes the photosensitive elements 112, 114, 121 and 123. In the third operation mode, the counter 110 counts photon detection events from the third subgroup 107, which includes the photosensitive elements 114, 123, 132 and 141. In the fourth operation mode, the counter 108 counts photon detection events from the fourth subgroup 108, which includes the photosensitive elements 113, 114, 131 and 132.

A number of photon detection events from each subgroup 105 to 108 counted by the counter 110 is stored in a 16-bit register. The register size of 16 bits merely provided as an example. The present disclosure is not limited to a register size of 16 bits. The skilled person will find various other appropriate register sizes.

However, the read-out of the subgroups 105 to 108 is carried out sequentially in four subsequent operation modes. Therefore, only one 16-bit register needs to be provided for the counter 110. In the first operation mode, the number of photon detection events from the first subgroup 105 is stored in the 16-bit register. In the second operation mode, the number of photon detection events from the second subgroup 106 is stored in the 16-bit register. In the third operation mode, the number of photon detection events from the third subgroup 107 is stored in the 16-bit register. In the fourth operation mode, the number of photon detection events from the fourth subgroup 108 is stored in the 16-bit register.

Therefore, by counting photon detection events sequentially and per subgroup instead of in parallel and per photosensitive element, and, thus, by requiring only one 16-bit register per counter, a space occupied by bits for storing a number of photon detection events can be reduced in some embodiments.

Figures 7, 8:
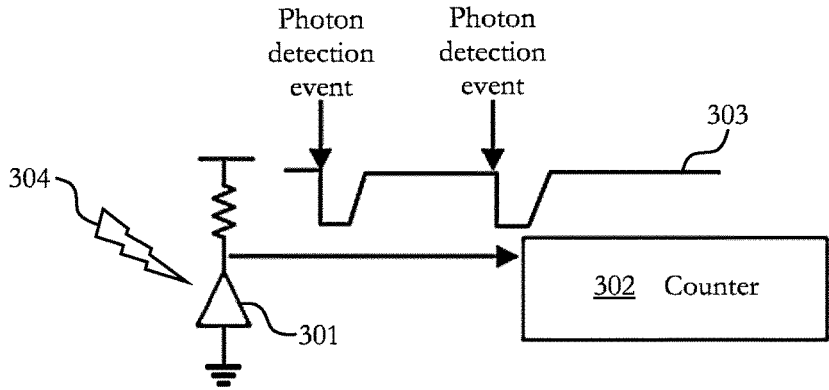
FIG. 7 illustrates a basic operation of an imaging device according to an embodiment.
FIG. 8 illustrates a circuit configuration according to an embodiment.

FIG. 7 illustrates a basic operation of the imaging device 1 according to an embodiment.

A SPAD-based photosensitive element 301, which is an example for any one of the photosensitive elements 111 to 114, 121 to 124, 131 to 134 and 141 to 144 of FIG. 2, is connected to a counter 302, which is an example for the corresponding counter 110, 120, 130 or 140 of FIG. 2.

When the photosensitive element 301 is connected to the counter 302, it provides a signal 303 to the counter 302. When a photon 304 arrives at the photosensitive element 301 and is detected in the SPAD of the photosensitive element 301, the SPAD of the photosensitive element 301 outputs a negative edge that represents the photon detection event. The counter 302 counts the negative edges and, thus, the photon detection events.

FIG. 8 illustrates a circuit configuration according to an embodiment. The circuit configuration is shown for the four-by-four block of the array 2 of photosensitive elements of FIG. 2. Free ends of wires indicate circuit sections that are not depicted.

The SPAD-based photosensitive elements 111 to 114 of FIG. 2, which are included in the first subgroup 105, are coupled to the counter 110 via an AND gate 411 and an OR gate 410. If a control signal G1_SEL input into the AND gate 411 is set to a high (H) level, the first subgroup 105 is connected to the counter 110, and signals that indicate photon detection events from any one of the photosensitive elements 111 to 114 are forwarded through the AND gate 411 and the OR gate 410 to the counter 110. If the control signal G1_SEL is set to a low (L) level, the AND gate 411 does not forward signals that indicate photon detection events from any one of the photosensitive elements 111 to 114, and the first subgroup is disconnected from the counter 110.

Also, the photosensitive elements 112, 114, 121 and 123 of the second subgroup 106 are coupled to the counter 110 via an AND gate 412 and the OR gate 410. If a control signal G2_SEL is set to a H level, the photosensitive elements 112, 114, 121 and 123 are connected to the counter 110, and signals that indicate photon detection events from any one of them are forwarded through the AND gate 412 and the OR gate 410 to the counter 110. If the control signal G2_SEL is set to a L level, the AND gate 412 does not forward signals, and the photosensitive elements 112, 114, 121 and 123 are disconnected from the counter 110.

Likewise, the photosensitive elements 114, 123, 132 and 141 of the third subgroup 107 and the photosensitive elements 113, 114, 131 and 132 of the fourth subgroup 108 are coupled to the counter 110 via the AND gate 413 and the OR gate 410. The third subgroup 107 and the fourth subgroup 108 are connected to the counter 110 by setting the control signals G3_SEL or G4_SEL, respectively, to a H level, and are disconnected from the counter 110 by setting the control signals G3_SEL or G4_SEL, respectively, to a L level.

In the first operation mode, the control signal G1_SEL is set to a H level such that the first subgroup 105 is connected to the counter 110, and the control signals G2_SEL, G3_SEL and G4_SEL are set to a L level such that the second, third and fourth subgroups 106, 107 and 108 are disconnected from the counter 110. In the second operation mode, the control signal G2_SEL is set to a H level such that the second subgroup 106 is connected to the counter 110, and the control signals G1_SEL, G3_SEL and G4_SEL are set to a L level such that the first, third and fourth subgroups 105, 107 and 108 are disconnected from the counter 110. In the third operation mode, the control signal G3_SEL is set to a H level such that the third subgroup 107 is connected to the counter 110, and the control signals G1_SEL, G2_SEL and G4_SEL are set to a L level such that the first, second and fourth subgroups 105, 106 and 108 are disconnected from the counter 110. In the fourth operation mode, the control signal G4_SEL is set to a H level such that the fourth subgroup 108 is connected to the counter 110, and the control signals G1_SEL, G2_SEL and G3_SEL are set to a L level such that the first, second and third subgroups 105, 106 and 107 are disconnected from the counter 110.

Likewise, the photosensitive elements 121 to 124 are coupled to the counter 120 via an AND gate 421 and an OR gate 420 and can be connected to the counter 120 by setting the control signal G1_SEL to a H level. The photosensitive elements 123, 124, 141 and 142 are coupled to the counter 120 via an AND gate 423 and the OR gate 420 and can be connected to the counter 120 by setting the control signal G4_SEL to a H level. The photosensitive elements 131 to 134 are coupled to the counter 130 via an AND gate 431 and an OR gate 430 and can be connected to the counter 130 by setting the control signal G1_SEL to a H level. The photosensitive elements 132, 134, 141 and 143 are coupled to the counter 130 via an AND gate 432 and the OR gate 430 and can be connected to the counter 130 by setting the control signal G2_SEL to a H level. The photosensitive elements 141 to 144 are coupled to the counter 140 via an AND gate 431 and an OR gate 440 and can be connected to the counter 140 by setting the control signal G1_SEL to a H level.

Thus, subgroups and their photosensitive elements can be connected to a counter by setting the corresponding control signal to a H level. Subgroups whose photon detection events should not be counted in an operation mode can be disconnected from a counter by setting the corresponding control signal to a L level such that corresponding AND gate blocks signals that indicate a photon detection event.

It is noted that the disclosure is not limited to the embodiment of FIG. 8. The skilled person will find other appropriate circuit configurations.

Figure 9:
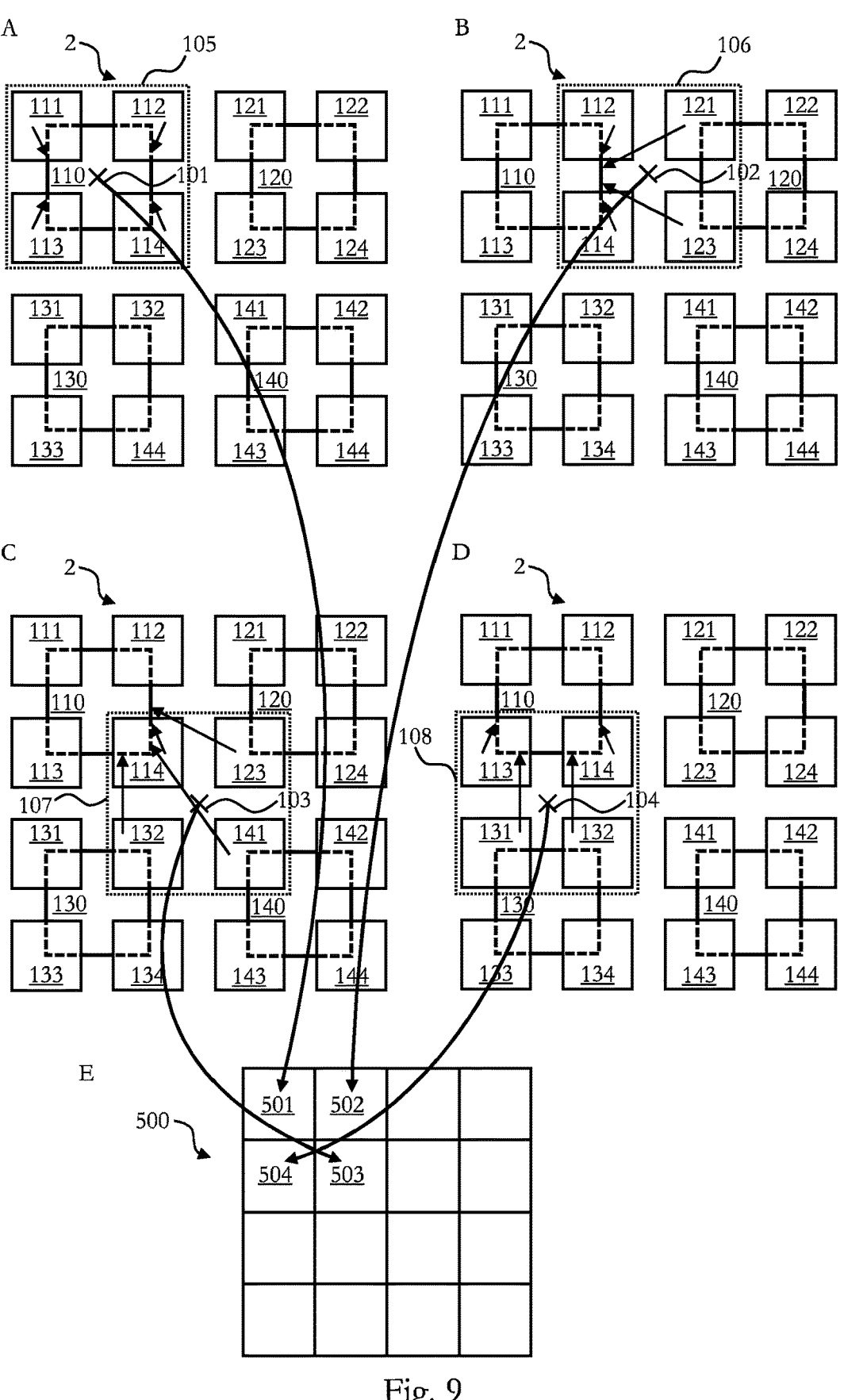
FIG. 9 illustrates a diagram of image data generated by an imaging device according to an embodiment.

FIG. 9 illustrates a diagram of image data generated by the imaging device 1 according to an embodiment.

Parts A to D of FIG. 9 correspond to the respective parts of FIG. 3. Part E of FIG. 9 shows a pixel array 500 of an image represented by image data that are generated by the imaging device 1 based on counted numbers of photon detection events.

The pixel array 500 includes pixels 501, 502, 503 and 504. A value of the pixel 501 is based on a counted number of photon detection events from the first subgroup 105. A value of the pixel 502 is based on a counted number of photon detection events from the second subgroup 106. A value of the pixel 503 is based on a counted number of photon detection events from the third subgroup 107. A value of the pixel 504 is based on a counted number of photon detection events from the fourth subgroup 108.

The pixels 501 to 504 are arranged according to the relative positions of the centers of gravity 101 to 104 of the respective subgroups 105 to 108 to each other.

Figure 10:
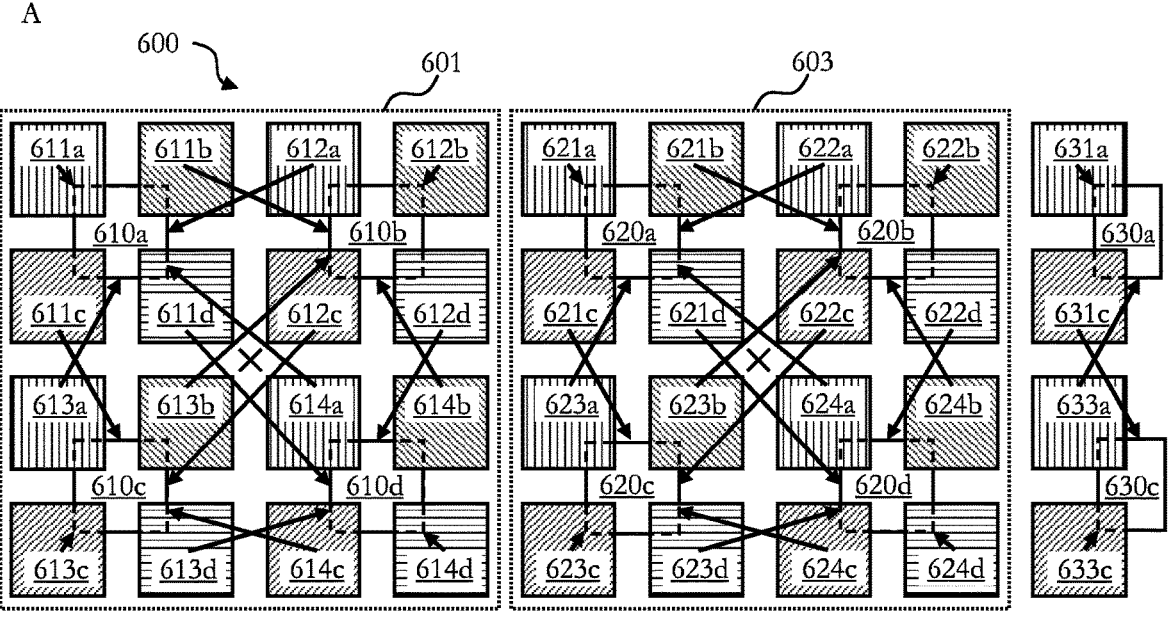
FIG. 10 shows a block diagram of a read-out principle in an array of photosensitive elements for color coding according to an embodiment.
Figure 10:
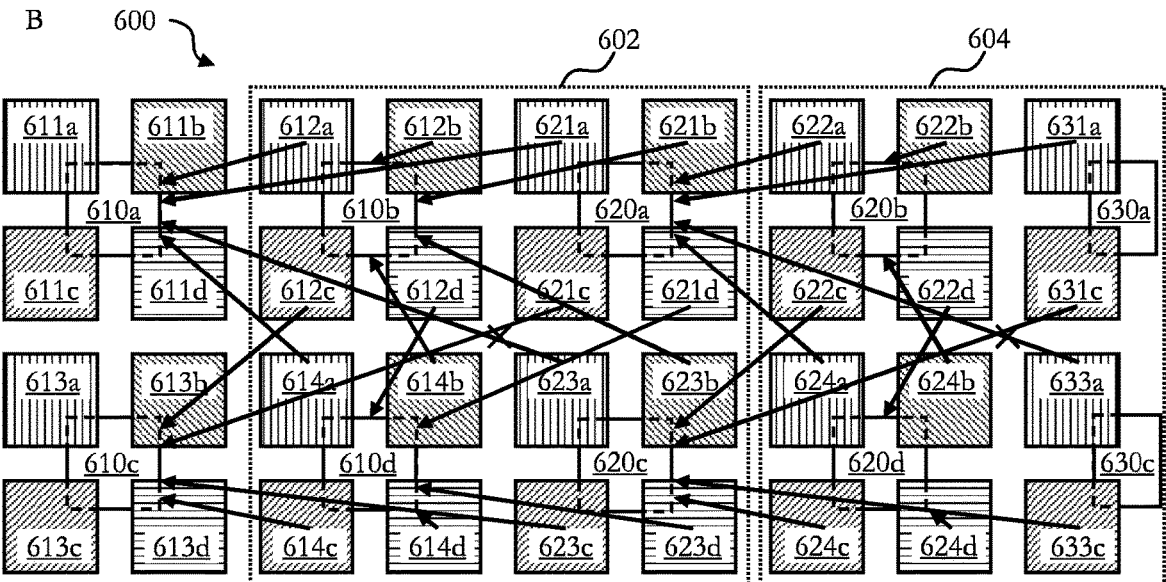

FIG. 10 shows a block diagram of a read-out principle in an array 600 of photosensitive elements for color coding according to an embodiment.

The array 600 of photosensitive elements is included in a color image sensor and is arranged like the array 2 of photosensitive elements of FIG. 2, with the difference that each photosensitive element of the array 600 includes four subelements and that each counter includes four subcounters. The photosensitive elements of the array 600 of photosensitive elements are based on SPADs. Each subelement of a photosensitive element is configured to detect photons of a predetermined color, and each subcounter is associated with a predetermined color and is configured to count photon detection events from the subelements for the corresponding color.

The photosensitive element 611 includes a subelement 611a for detecting red light, subelement 611b and 611c for detecting green light and a subelement 611d for detecting blue light. The other photosensitive elements are configured likewise: Subelements with a reference sign ending with "a" are configured to detect red light and are hatched vertically. Subelements with a reference sign ending with "b" or "c" are configured to detect green light and are hatched diagonally. Subelements with a reference sign ending with "d" are configured to detect blue light and are hatched horizontally.

Thus, the subelements are arranged according to the Bayer pattern for color coding in a Red-Green-Blue (RGB) color sensor.

Similarly, the counters 610, 620 and 630 include four subcounters each, wherein a subcounter with a reference sign ending with "a" is associated with red, subcounters with a reference sign ending with "b" or "c" are associated with green, and a subcounter with a reference sign ending with "d" is associated with blue.

Part A of FIG. 10 shows a first operation mode of the array 600 of photosensitive elements.

A first subgroup 601 includes photosensitive elements 611, 612, 613 and 614 and is connected to a first counter 610. The subelements 611a, 612a, 613a and 614a are configured to detect red light and are connected to the subcounter 610a. The subelements 611b, 612b, 613b and 614b are configured to detect green light and are connected to the subcounter 610b. The subelements 611c, 612c, 613c and 614c are configured to detect green light and are connected to the subcounter 610c. The subelements 611d, 612d, 613d and 614d are configured to detect blue light and are connected to the subcounter 610d.

The center of gravity of the first subgroup 601 is shown as a cross between the subelements 611d, 612c, 613b and 614a.

Part B of FIG. 10 shows a second operation mode of the array 600 of photosensitive elements.

A second subgroup 602 includes the photosensitive elements 612, 614, 621 and 623 and is connected to the first counter 610.

The subelements 612a, 614a, 621a and 623a that are configured to detect red light are connected to the subcounter 610a associated with red. The subelements 612b, 614b, 621b and 623b that are configured to detect green light are connected to the subcounter 610b associated with green. The subelements 612c, 614c, 621c and 623c that are configured to detect green light are connected to the subcounter 610c associated with green. The subelements 612d, 614d, 621d and 623d that are configured to detect blue light are connected to the subcounter 610d associated with blue.

The center of gravity of the second subgroup 602 is illustrated as a cross between the subelements 612d, 621c, 614b and 623a. It is shifted by one photosensitive element (i.e., by two subelements) to the right with respect to the first subgroup 601. Thus, numbers of counted photon detection events from the first subgroup 601 and from the second subgroup 602 correspond to different centers of gravity.

FIG. 10 further shows a second counter 620 and (partially) a third counter 630.

In the first operation mode, a third subgroup 603, including photosensitive elements 612, 622, 623 and 624, is connected to the second counter 620. The subelements 621a, 622a, 623a and 624a for detecting red light are connected to the subcounter 620a associated with red. The subelements 621b, 622b, 623b and 624b for detecting green light are connected to the subcounter 620b associated with green. The subelements 621c, 622c, 623c and 624c for detecting green light are connected to the subcounter 620c associated with green. The subelements 621d, 622d, 623d and 624d for detecting blue light are connected to the subcounter 620d associated with blue.

Further, as partially shown, subelements 631a and 633a for detecting red light are connected to a subcounter 630a associated with red of the counter 630, and subelements 631c and 633c for detecting green light are connected to a subcounter 630c associated with green of the counter 630.

In the second operation mode, a fourth subgroup 604 (partially shown) includes the photosensitive elements 622, 624, 631 and 633 and is connected to the second counter 620. The subelements 622a, 624a, 631a and 633a for detecting red light are connected to the subcounter 620a associated with red. The subelements 622b and 624b for detecting green light are connected to the subcounter 620b associated with green. The subelements 622c, 624c, 631c and 633c for detecting green light are connected to the subcounter 620c associated with green light. The subelements 622d and 624d for detecting blue light are connected to the subcounter 620d associated with blue.

Although only two operation modes of the array 600 of photosensitive elements are shown in FIG. 10, the array 600 of photosensitive elements is configured to be operated in four operation modes, wherein two further subgroups can be connected to each counter, as shown in FIGS. 3 and 4.

Figure 11:
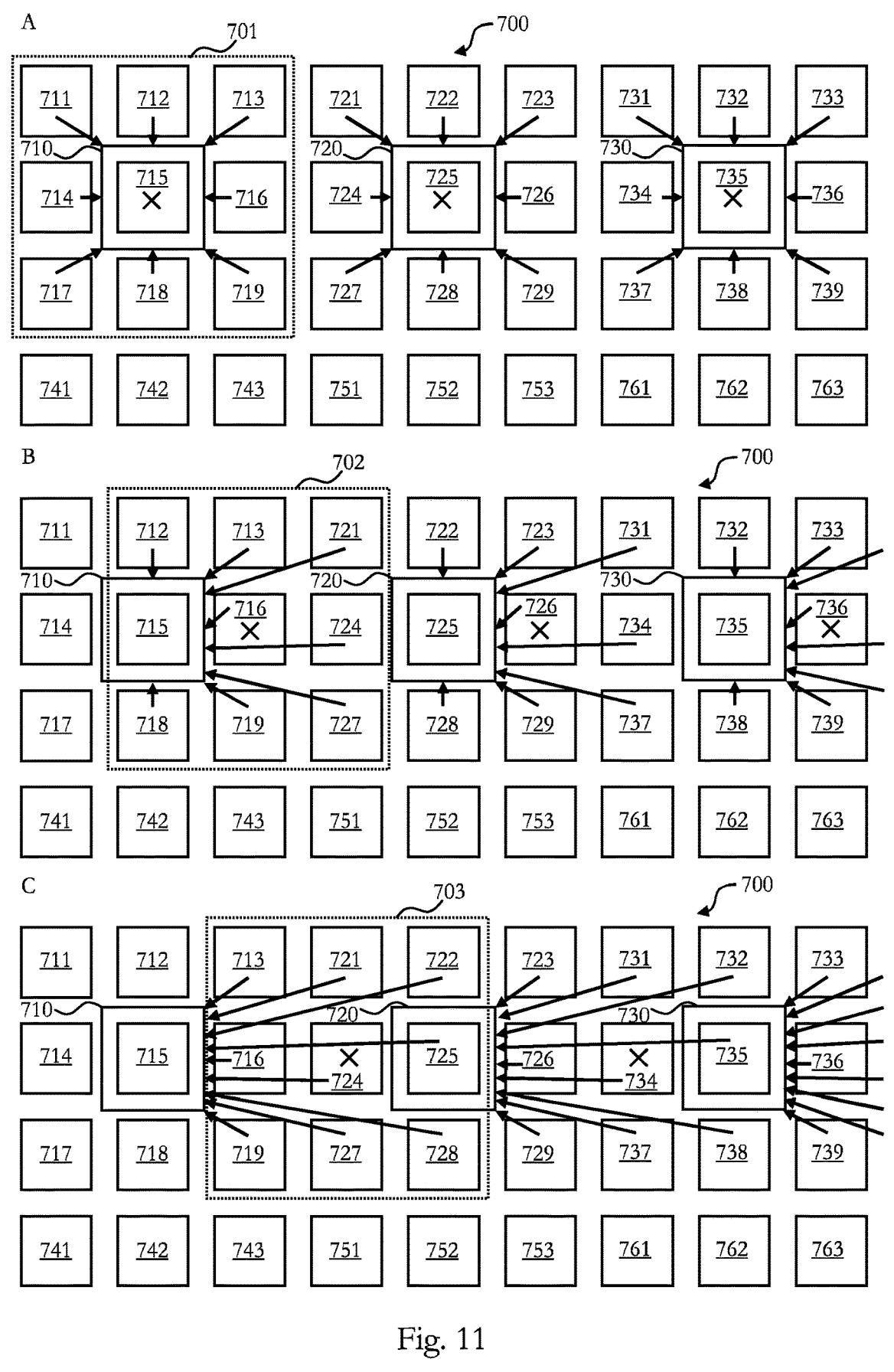

FIG. 11 shows a block diagram of a three-by-three binning in an array 700 of photosensitive elements according to an embodiment.

The array 700 of photosensitive elements is an example of an array of photosensitive elements that can be included in the imaging device 1 instead of the array 2 of photosensitive elements. The photosensitive elements of the array 700 of photosensitive elements are based on SPADs.

For three-by-three binning of photosensitive elements, nine photosensitive elements arranged in three rows and three columns are connected to a counter in each operation mode, i.e., each subgroup of a group of photosensitive elements that are coupled to a counter is quadratic and includes nine photosensitive elements.

In the array 700 of FIG. 11, each counter is coupled to a group of 25 photosensitive elements arranged in five rows and five columns. Each such group includes nine quadratic subgroups, wherein each subgroup includes nine photosensitive elements arranged in three rows and three columns. The centers of gravity of the subgroups differ between subgroups. In FIG. 11, the centers of gravity are indicated by crosses. Each counter can be individually connected to (and disconnected from) each of the nine quadratic subgroups.

Since photon detection events from each subgroup are counted in a corresponding operation mode in which the respective subgroup is connected to a counter, the array 700 of photosensitive elements can be operated in nine different operation modes. In each operation mode, another one of the nine subgroups of a group of photosensitive elements is connected to the corresponding counter such that photon detection events therefrom are counted.

Part A of FIG. 11 shows a first operation mode in which a first subgroup 701, which includes photosensitive elements 711 to 713, is connected to a first counter 710 for counting photon detection events. Furthermore, photosensitive elements 721 to 729 are connected to a second counter 720 for counting photon detection events, and photosensitive elements 731 to 739 are connected to a third counter 730 for counting photon detection events.

Part B of FIG. 11 shows a second operation mode in which a second subgroup 702, which includes the photosensitive elements 712, 713, 715, 716, 718, 719, 721, 724 and 727, is connected to the first counter 710 for counting photon detection events. The second subgroup 702 (and its center of gravity) are shifted to the right by one photosensitive element with respect to the first subgroup 701. The second counter 720 is connected to the photosensitive elements 722, 723, 725, 726, 728, 729, 731, 734 and 737 for counting photon detection events. The third counter 730 is connected to the photosensitive elements 732, 733, 735, 736, 738 and 739, as well as to three photosensitive elements that are not depicted in FIG. 11, for counting photon detection events.

Part C of FIG. 11 shows a third operation mode in which a third subgroup 703, which includes the photosensitive elements 713, 716, 719, 721, 722, 724, 725, 727 and 728, is connected to the first counter 710 for counting photon detection events. The second subgroup 703 (and its center of gravity) are shifted to the right by one photosensitive element with respect to the second subgroup 702. The second counter 720 is connected to the photosensitive elements 723, 726, 729, 731, 732, 734, 735, 737 and 738 for counting photon detection events. The third counter 730 is connected to the photosensitive elements 733, 736 and 739, as well as to six photosensitive elements that are not depicted in FIG. 11, for counting photon detection events.

In addition to the three operation modes shown in parts A to C of FIG. 11, the array 700 of photosensitive elements can be operated in six further operation modes that are not depicted in FIG. 11. In fourth to sixth operation modes, the counters 710, 720 and 730 are connected to subgroups that are shifted down by one photosensitive element with respect to the subgroups 701, 702 and 703 shown in parts A to C. In seventh to ninth operation modes, the counters 710, 720 and 730 are connected to subgroups that are shifted down by two photosensitive elements with respect to the subgroups 701, 702 and 703 shown in parts A to C. The centers of gravity of the subgroups of the fourth to ninth operation mode are shifted down accordingly.

Thus, in the array 700 of photosensitive elements, three-by-three binning is performed such that a number of photon detection events counted by a counter 710, 720 or 730 is a sum of number of counted photon detection events from nine photosensitive elements.

Performing three-by-three binning allows to provide one counter for nine photosensitive elements instead of two-by-two binning with one counter for four photosensitive elements. Thus, fewer counters are required and a size per photosensitive element (i.e., an area occupied per photosensitive element) is reduced. By performing pixel shift, a high resolution on an image generated by the imaging device 1 can be obtained.

FIG. 12 shows a flow diagram of a method 800 for operating the imaging device 1 according to an embodiment.

The method 800 operated the imaging device 1 with an array of photosensitive elements based on SPADs such as the array 2 of photosensitive elements of FIGS. 2 to 4, the array 600 of photosensitive elements of FIG. 10 or the array 700 of photosensitive elements of FIG. 11. Accordingly, examples of a first counter operated by the method 800 include the first counter 110 of FIGS. 2 to 4, the first counter 610 of FIG. 10 and the first counter 710 of FIG. 11. Examples of a second counter operated by the method 800 include the second counter 120 of FIGS. 2 to 4, the second counter 620 of FIG. 11 and the second counter 720 of FIG. 11. A first group of photosensitive elements operated by the method 800 includes all photosensitive elements coupled to the first counter, such as, e.g., the first group 100 of FIG. 2. A first subgroup operated by the method 800 includes the first subgroup 105 of FIGS. 2 to 4, the first subgroup 601 of FIG. 10 and the first subgroup 701 of FIG. 11. A second subgroup operated by the method 800 includes the second subgroup 106 of FIGS. 2 to 4, the second subgroup 602 of FIG. 10 and the second subgroup 702 of FIG. 11. Examples of a second group of photosensitive elements operated by the method 800 include the groups of photosensitive elements that are coupled (i.e., that can be connected) to the second counter 120, 620 or 720 of FIG. 2 to 4, 10 or 11, respectively, and examples of a third subgroup and a fourth subgroup operated by the method include such subgroups in FIGS. 2 to 4, 10 and 11 that are connected to the respective second counter 120, 620 or 720 in the first operation mode or the second operation mode, respectively.

At S800a, an equal number of photosensitive elements is included in all subgroups of the first group of photosensitive elements and of a second group of photosensitive elements.

At S800b, in each subgroup of the first group of photosensitive elements and of the second group of photosensitive elements, fewer photosensitive elements are included than in the first group of photosensitive elements or in the second group of photosensitive elements, respectively.

At S800c, a number of subgroups of the first group of photosensitive elements and of the second group of photosensitive elements is chosen such that each photosensitive element of the first group of photosensitive elements and of the second group of photosensitive elements is covered by at least one subgroup of the first group of photosensitive elements or of the second group of photosensitive elements, respectively.

The procedure of S800a, S800b and S800c is for preparation of the array of photosensitive elements.

At S810, photon detection events received from the first group of photosensitive elements of the array of photosensitive elements are counted with the first counter.

For counting the photon detection events at S810, the first counter is connected, at S811, to the first subgroup of the first group of photosensitive elements in a first operation mode 801. This includes individually connecting the first subgroup to the first counter. Then, at S812, a number of photon detection events received in the first operation mode 801 from the first subgroup is counted with the first counter. This includes the procedure of S812a, S812b and S812c for acquiring color image data.

At S812a, a number of photon detection events received, in the first operation mode, from first subelements, configured to detect red light, of the photosensitive elements of the first subgroup are counted with a first color counter, associated with red, of the first counter.

At S812b, a number of photon detection events received, in the first operation mode, from second subelements, configured to detect green light, of the photosensitive elements of the first subgroup are counted with a second color counter, associated with green, of the first counter.

At S812c, a number of photon detection events received, in the first operation mode, from third subelements, configured to detect blue light, of the photosensitive elements of the first subgroup are counted with a third color counter, associated with blue, of the first counter.

Then, in a second operation mode 802, the first counter is connected, at S813, to the second subgroup of the first group of photosensitive elements. This means that the second operation mode 802 is performed after the first operation mode 801, and the first and second subgroups are sequentially connected to the first counter, in the first and second operation modes, respectively. The connecting of the first counter to the second subgroup at S813 includes individually connecting the second subgroup to the first counter.

At S814, a number of photon detection events received in the second operation mode from the second subgroup of the first group of photosensitive elements is counted with the first counter. This includes the procedure of S814a, S814b and S814c for acquiring color image data.

At S814a, a number of photon detection events received, in the second operation mode, from first subelements, configured to detect red light, of the photosensitive elements of the second subgroup are counted with a first color counter, associated with red, of the first counter.

At S814b, a number of photon detection events received, in the second operation mode, from second subelements, configured to detect green light, of the photosensitive elements of the second subgroup are counted with a second color counter, associated with green, of the first counter.

At S814c, a number of photon detection events received, in the second operation mode, from third subelements, configured to detect blue light, of the photosensitive elements of the second subgroup are counted with a third color counter, associated with blue, of the first counter.

At S820, photon detection events received from a second group of photosensitive elements of the array of photosensitive elements are counted with a second counter. This includes connecting, at S821, in the first operation mode 801, the second counter to a third subgroup of the second group of photosensitive elements, wherein the third subgroup of the second group of photosensitive elements overlaps the second subgroup of the first group of photosensitive elements in at least one photosensitive element, and counting, at S822, with the second counter, a number of photon detection events received, in the first operation mode 801, from the third subgroup.

S822 includes counting photon detection events received from subelements of the third subgroup with subcounters associated with red, green or blue, similarly to the procedure of S812a, S812b and S812c. However, a description of detecting different colors at S822 is omitted for brevity.

At S823, the second counter is connected, in the second operation mode 802, to a fourth subgroup of the second group of photosensitive elements.

At S824, a number of photon detection events received, in the second operation mode 802, from the fourth subgroup of the second group of photosensitive elements is counted with the second counter.

At S830 image data are generated, wherein a first pixel of the image data is based on a number of photon detection events of the first subgroup in the first operation mode 801, and a second pixel of the image data is based on a number of photon detection events of the second subgroup in the second operation mode 802.

The counting of photon detection events at S812, S814, S822 and S824 includes detecting, in each photosensitive element of the first or second group of photosensitive elements, respectively, photons with a Single Photon Avalanche Diode (SPAD).

With the imaging device 1 according to the present disclosure, it may be possible to achieve a smaller size of photosensitive elements without trade-off on the number of bits of the counter. The implementation of one counter for a predefined number of photosensitive elements (e.g., four photosensitive elements) allows to reduce the counter area required for the predefined number (e.g., four) of photosensitive elements. The connection between the photosensitive elements and the counter is controllable, which allows a shift of the photosensitive elements that are read out.

It should be recognized that the embodiments describe methods with an exemplary ordering of method steps. The specific ordering of method steps is however given for illustrative purposes only and should not be construed as binding. For example, the ordering of S812a, S812b and S812c and/or the ordering of S814a, S814b and S814c in the embodiment of FIG. 12 may be exchanged. Also, the ordering of S810 and S820 and/or the ordering of the first operation mode 801 and the second operation mode 802 in the embodiment of FIG. 12 may be exchanged. Other changes of the ordering of method steps may be apparent to the skilled person.

Please note that the division of the control into units 21 to 22 is only made for illustration purposes and that the present disclosure is not limited to any specific division of functions in specific units. For instance, the control 21 and/or 22 could be implemented by a respective programmed processor, field programmable gate array (FPGA) and the like.

The method 800 of FIG. 12 can also be implemented as a computer program causing a computer and/or a processor, such as the control unit 21 discussed above, to perform the method, when being carried out on the computer and/or processor. In some embodiments, also a non-transitory computer-readable recording medium is provided that stores therein a computer program product, which, when executed by a processor, such as the processor described above, causes the method described to be performed.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) An imaging device comprising:

an array of photosensitive elements; and a first counter for counting photon detection events received from a first group of photosensitive elements;

wherein, in a first operation mode, the first counter is connected to a first subgroup of the first group of photosensitive elements and wherein, in a second operation mode, the first counter is connected to a second subgroup of the first group of photosensitive elements.

(2) The imaging device of (1), wherein the first counter is provided in a first semiconductor layer, the array of photosensitive elements is provided in a second semiconductor layer, and the first counter overlaps an area in which the first subgroup is provided.

(3) The imaging device of (2), wherein the first semiconductor layer is provided on a first chip, and the second semiconductor layer is provided on a second chip.

(4) The imaging device of any one of (1) to (3), wherein each subgroup of the first group of photosensitive elements is configured to be individually connected to the first counter.

(5) The imaging device of any one of (1) to (4), further comprising an image data generation unit configured to generate image data, wherein a first pixel of the image data is based on a number of photon detection events of the first subgroup in the first operation mode, and a second pixel of the image data is based on a number of photon detection events of the second subgroup in the second operation mode.

(6) The imaging device of any one of (1) to (5), further comprising a second counter for counting photon detection events received from a second group of photosensitive elements of the array of photosensitive elements;

wherein, in the first operation mode, the second counter is connected to a third subgroup of the second group of photosensitive elements and, in the second operation mode, the second counter is connected to a fourth subgroup of the second group of photosensitive elements; and wherein the third subgroup of the second group of photosensitive elements overlaps the second subgroup of the first group of photosensitive elements in at least one photosensitive element.

(7) The imaging device of any one of (1) to (6), wherein each of the first subgroup and the second subgroup includes at least two photosensitive elements; and wherein the first subgroup and the second subgroup overlap in at least one photosensitive element.

(8) The imaging device of (7), wherein each of the first subgroup and the second subgroup includes at least two rows of photosensitive elements and at least two columns of photosensitive elements.

(9) The imaging device of any one of (7) or (8), wherein each of the first subgroup and the second subgroup is quadratic.

(10) The imaging device of (9), wherein each of the first subgroup and the second subgroup includes two rows of photosensitive elements and two columns of photosensitive elements.

(11) The imaging device of (9), wherein each of the first subgroup and the second subgroup includes three rows of photosensitive elements and three columns of photosensitive elements.

(12) The imaging device of any one of (1) to (11), wherein each photosensitive element of the first group of photosensitive elements includes a first subelement for detecting light of a first color and a second subelement for detecting light of a second color; and wherein the first counter includes a first color counter for counting photon detection events received from the first subelement and a second color counter for counting photon detection events received from the second subelement.

(13) The imaging device of any one of (1) to (12), wherein all subgroups of the first group of photosensitive elements include an equal number of photosensitive elements; and wherein each subgroup of the first group of photosensitive elements includes fewer photosensitive elements than the first group of photosensitive elements.

(14) The imaging device of (13), wherein a number of subgroups of the first group of photosensitive elements is chosen such that each photosensitive element of the first group of photosensitive elements is covered by at least one subgroup of the first group of photosensitive elements.

(15) The imaging device of (14), wherein the subgroups of the first group of photosensitive elements are sequentially connected to the first counter in respective operation modes.

(16) The imaging device of any one of (1) to (15), wherein each photosensitive element of the first group of photosensitive elements includes a Single Photon Avalanche Diode.

(17) A method for operating an imaging device, comprising:

counting, with a first counter, photon detection events received from a first group of photosensitive elements of an array of photosensitive elements;

connecting, in a first operation mode, the first counter to a first subgroup of the first group of photosensitive elements; and connecting, in a second operation mode, the first counter to a second subgroup of the first group of photosensitive elements.

(18) The method of (17), wherein the connecting of the first counter to the first subgroup includes individually connecting the first subgroup to the first counter; and wherein the connecting of the first counter to the second subgroup includes individually connecting the second subgroup to the first counter.

(19) The method of any one of (17) and (18), wherein the counting of photon detection events includes:

counting, with the first counter, a number of photon detection events received, in the first operation mode, from the first subgroup; and counting, with the first counter, a number of photon detection events received, in the second operation mode, from the second subgroup.

(20) The method of any one of (17) to (19), further comprising generating image data, wherein a first pixel of the image data is based on a number of photon detection events of the first subgroup in the first operation mode, and a second pixel of the image data is based on a number of photon detection events of the second subgroup in the second operation mode.

(21) The method of any one of (17) to (20), further comprising:

counting, with a second counter, photon detection events received from a second group of photosensitive elements of the array of photosensitive elements;

connecting, in the first operation mode, the second counter to a third subgroup of the second group of photosensitive elements; and connecting, in the second operation mode, the second counter to a fourth subgroup of the second group of photosensitive elements;

wherein the third subgroup of the second group of photosensitive elements overlaps the second subgroup of the first group of photosensitive elements in at least one photosensitive element.

(22) The method of (21), wherein the counting of photon detection events includes:

counting, with the second counter, a number of photon detection events received, in the first operation mode, from the third subgroup; and counting, with the second counter, a number of photon detection events received, in the second operation mode, from the fourth subgroup.

(23) The method of any one of (17) to (22), wherein the counting of photon detection events includes:

counting, with a first color counter of the first counter, a number of photon detection events received, in the first operation mode, from first subelements of the photosensitive elements of the first subgroup;

counting, with a second color counter of the first counter, a number of photon detection events received, in the first operation mode, from second subelements of the photosensitive elements of the first subgroup;

counting, with the first color counter, a number of photon detection events received, in the second operation mode, from first subelements of the photosensitive elements of the second subgroup; and counting, with the second color counter, a number of photon detection events received, in the second operation mode, from second subelements of the photosensitive elements of the second subgroup.

(24) The method of any one of (17) to (23), further comprising:

including, in all subgroups of the first group of photosensitive elements, an equal number of photosensitive elements; and including, in each subgroup of the first group of photosensitive elements, fewer photosensitive elements than in the first group of photosensitive elements.

(25) The method of (24), further comprising choosing a number of subgroups of the first group of photosensitive elements such that each photosensitive element of the first group of photosensitive elements is covered by at least one subgroup of the first group of photosensitive elements.

(26) The method of (25), comprising connecting the subgroups of the first group of photosensitive elements sequentially to the first counter in respective operation modes.

(27) The method of any one of (17) to (26), further comprising:

detecting, in each photosensitive element of the first group of photosensitive elements, photons with a Single Photon Avalanche Diode.

(28) A computer program comprising program code causing a computer to perform the method according to anyone of (17) to (27), when being carried out on a computer.

(29) A non-transitory computer-readable recording medium that stores therein a computer program product, which, when executed by a processor, causes the method according to anyone of (17) to (27) to be performed.

The invention claimed is:

1. An imaging device comprising:

an array of photosensitive elements; and a first counter for counting photon detection events received from a first group of photosensitive elements, wherein, in a first operation mode, the first counter is connected to a first subgroup of the first group of photosensitive elements, wherein, in a second operation mode, the first counter is connected to a second subgroup of the first group of photosensitive elements, wherein each of the first subgroup and the second subgroup includes at least two photosensitive elements; and wherein the first subgroup and the second subgroup overlap in at least one photosensitive element.

2. The imaging device of claim 1, wherein the first counter is provided in a first semiconductor layer, the array of photosensitive elements is provided in a second semiconductor layer, and the first counter overlaps an area in which the first subgroup is provided.

3. The imaging device of claim 2, wherein the first semiconductor layer is provided on a first chip, and the second semiconductor layer is provided on a second chip.

4. The imaging device of claim 1, wherein each subgroup of the first group of photosensitive elements is configured to be individually connected to the first counter.

5. The imaging device of claim 1, further comprising an image data generation unit configured to generate image data, wherein a first pixel of the image data is based on a number of photon detection events of the first subgroup in the first operation mode, and a second pixel of the image data is based on a number of photon detection events of the second subgroup in the second operation mode.

6. The imaging device of claim 1, further comprising a second counter for counting photon detection events received from a second group of photosensitive elements of the array of photosensitive elements, wherein, in the first operation mode, the second counter is connected to a third subgroup of the second group of photosensitive elements and, in the second operation mode, the second counter is connected to a fourth subgroup of the second group of photosensitive elements; and wherein the third subgroup of the second group of photosensitive elements overlaps the second subgroup of the first group of photosensitive elements in at least one photosensitive element.

7. The imaging device of claim 1, wherein each photosensitive element of the first group of photosensitive elements includes a first subelement for detecting light of a first color and a second subelement for detecting light of a second color; and wherein the first counter includes a first color counter for counting photon detection events received from the first subelement and a second color counter for counting photon detection events received from the second subelement.

8. The imaging device of claim 1, wherein all subgroups of the first group of photosensitive elements include an equal number of photosensitive elements; and wherein each subgroup of the first group of photosensitive elements includes fewer photosensitive elements than the first group of photosensitive elements.

9. The imaging device of claim 8, wherein a number of subgroups of the first group of photosensitive elements is chosen such that each photosensitive element of the first group of photosensitive elements is covered by at least one subgroup of the first group of photosensitive elements.

10. A method for operating an imaging device, comprising:

counting, with a first counter, photon detection events received from a first group of photosensitive elements of an array of photosensitive elements;

connecting, in a first operation mode, the first counter to a first subgroup of the first group of photosensitive elements; and connecting, in a second operation mode, the first counter to a second subgroup of the first group of photosensitive elements, wherein each of the first subgroup and the second subgroup includes at least two photosensitive elements; and wherein the first subgroup and the second subgroup overlap in at least one photosensitive element.

11. The method of claim 10, wherein the connecting of the first counter to the first subgroup includes individually connecting the first subgroup to the first counter; and wherein the connecting of the first counter to the second subgroup includes individually connecting the second subgroup to the first counter.

12. The method of claim 10, wherein the counting of photon detection events includes:

counting, with the first counter, a number of photon detection events received, in the first operation mode, from the first subgroup; and counting, with the first counter, a number of photon detection events received, in the second operation mode, from the second subgroup.

13. The method of claim 10, further comprising generating image data, wherein a first pixel of the image data is based on a number of photon detection events of the first subgroup in the first operation mode, and a second pixel of the image data is based on a number of photon detection events of the second subgroup in the second operation mode.

14. The method of claim 10, further comprising:

counting, with a second counter, photon detection events received from a second group of photosensitive elements of the array of photosensitive elements;

connecting, in the first operation mode, the second counter to a third subgroup of the second group of photosensitive elements; and connecting, in the second operation mode, the second counter to a fourth subgroup of the second group of photosensitive elements, wherein the third subgroup of the second group of photosensitive elements overlaps the second subgroup of the first group of photosensitive elements in at least one photosensitive element.

15. The method of claim 14, wherein the counting of photon detection events includes:

counting, with the second counter, a number of photon detection events received, in the first operation mode, from the third subgroup; and counting, with the second counter, a number of photon detection events received, in the second operation mode, from the fourth subgroup.

16. The method of claim 10, wherein the counting of photon detection events includes:

counting, with a first color counter of the first counter, a number of photon detection events received, in the first operation mode, from first subelements of the photosensitive elements of the first subgroup;

counting, with a second color counter of the first counter, a number of photon detection events received, in the first operation mode, from second subelements of the photosensitive elements of the first subgroup;

counting, with the first color counter, a number of photon detection events received, in the second operation mode, from first subelements of the photosensitive elements of the second subgroup; and counting, with the second color counter, a number of photon detection events received, in the second operation mode, from second subelements of the photosensitive elements of the second subgroup.

17. The method of claim 10, further comprising:

including, in all subgroups of the first group of photosensitive elements, an equal number of photosensitive elements; and including, in each subgroup of the first group of photosensitive elements, fewer photosensitive elements than in the first group of photosensitive elements.

18. The method of claim 17, further comprising choosing a number of subgroups of the first group of photosensitive elements such that each photosensitive element of the first group of photosensitive elements is covered by at least one subgroup of the first group of photosensitive elements.

19. The method of claim 18, further comprising connecting the subgroups of the first group of photosensitive elements sequentially to the first counter in respective operation modes.

20. An imaging device comprising:

an array of photosensitive elements; and a first counter for counting photon detection events received from a first group of photosensitive elements, wherein, in a first operation mode, the first counter is connected to a first subgroup of the first group of photosensitive elements, wherein, in a second operation mode, the first counter is connected to a second subgroup of the first group of photosensitive elements, wherein each photosensitive element of the first group of photosensitive elements includes a first subelement for detecting light of a first color and a second subelement for detecting light of a second color, and wherein the first counter includes a first color counter for counting photon detection events received from the first subelement and a second color counter for counting photon detection events received from the second subelement.

* * * * *